Aug. 14, 1923.

A. L. NELSON

PISTON

Filed March 7, 1921

1,465,144

Inventor
Adolph L. Nelson

By

Attorney

Patented Aug. 14, 1923.

1,465,144

UNITED STATES PATENT OFFICE.

ADOLPH L. NELSON, OF INDIANAPOLIS, INDIANA, ASSIGNOR OF ONE-THIRD TO CHARLES S. CRAWFORD, OF INDIANAPOLIS, INDIANA.

PISTON.

Application filed March 7, 1921. Serial No. 450,190.

*To all whom it may concern:*

Be it known that I, ADOLPH L. NELSON, a citizen of the United States, residing at Indianapolis, in the county of Marion and State of Indiana, have invented certain new and useful Improvements in Pistons, of which the following is a specification.

As is well understood one of the difficulties in the construction of internal combustion engines is to secure a piston which will expand and contract uniformly with the contraction and expansion of the cylinder, thereby securing a quiet running engine and avoid the noise and other disadvantages resulting from what is commonly termed "piston slap" therein.

My present invention consists in certain modifications of a construction forming the subject matter of my pending application No. 419,938 whereby the purposes may be accomplished as will be hereinafter more fully described and claimed.

Figure 1:
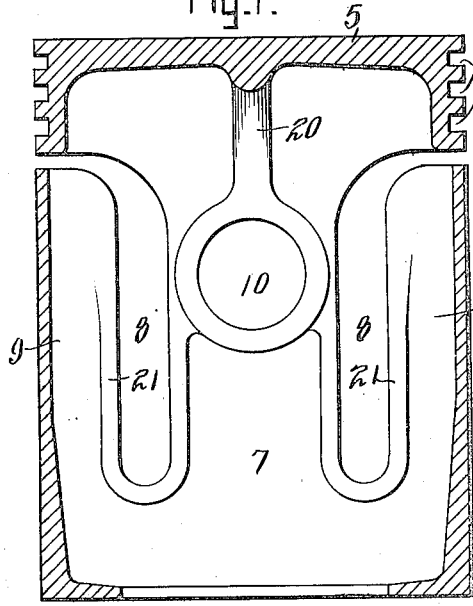
Figure 2:
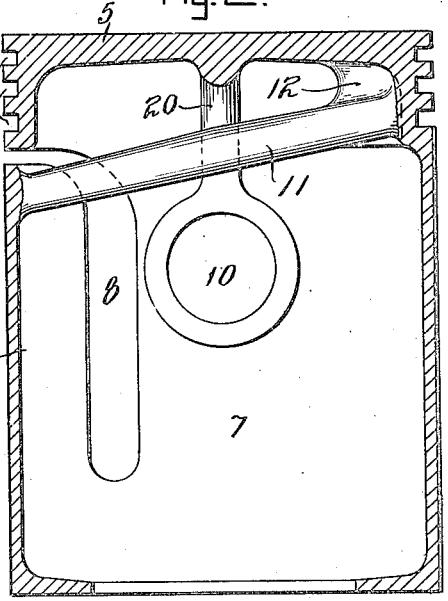
Figure 3:
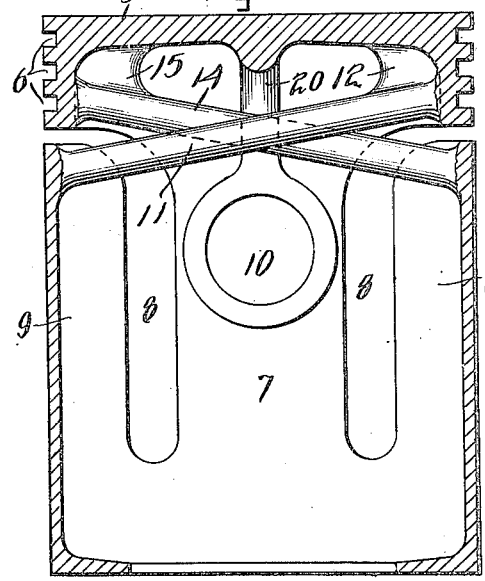
Figure 4:
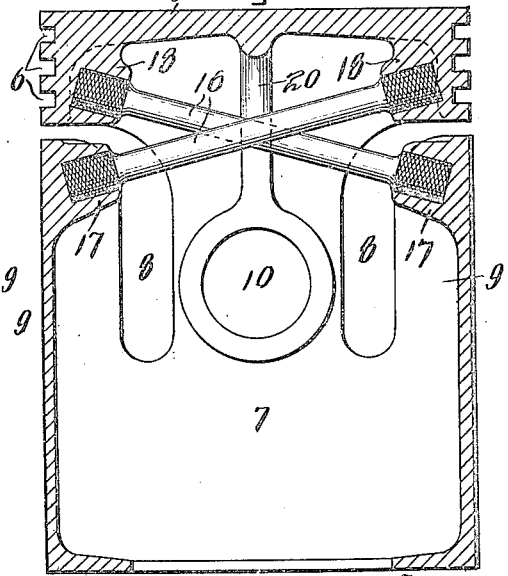

Referring to the accompanying drawings which are made a part hereof and on which similar reference characters indicate similar parts, Figure 1 is a central vertical section through a piston constructed in accordance with my said invention, Figure 2 is a similar view showing a modified form, Figure 3 is a similar view showing still another modified form, and Figure 4 a similar view showing still another modified form.

In the construction shown in Figure 1 the piston consists of a head 5 and a skirt 7 extending rearwardly from said head and provided with wrist-pin bearings 10.

It will be understood, of course, that the head 5 containing the piston grooves 6 is of slightly less diameter than the largest diameter of the skirt 7 but that the difference is not sufficient so that it can be clearly indicated on the drawings.

The purpose is to provide a piston which in use will maintain a constantly uniform fit between the sides opposed to the axial line of the wrist-pin and the inner surface of the cylinder, for in operation such piston slap as develops will be between such sides of the piston and the cylinder.

The head 5 being more directly subjected to the heat than the other portions of the piston, its contraction and expansion will be greater and for this reason the greater clearance is provided which is taken care of by the piston packing rings. In carrying out the purpose of my invention my aim is to so construct the skirt that its bearing sides, that is, the sides opposed to the axial line of the wrist-pin, will be subjected to substantially the same contraction and expansion as the cylinder so that the uniform fit desired may be secured and maintained.

In Figure 1, I show the bearing sides of the skirt 7 of the piston separated from the head 5 by means of slots 8 which extend in from the opposite sides of the piston for a distance parallel with the face of the piston head and then extend longitudinally of the skirt to a point beyond the wrist-pin bearings thus forming portions 9 in the said bearing sides that are separated at their upper ends from the head and integral with the body of the skirt at their lower ends. Said portions 9 are braced to the body of the skirt by means of a flange 21 surrounding the slot; and the metal toward the lower or outer end of the skirt is thickened to afford the stiffness and rigidity desired.

In Figure 2 I show the slot 8 formed in one side only and the portion 9 thus separated connected by a diagonal brace bar 11 with the head 5 on the opposite side of the piston. Said brace bar 11 is joined to the head by a web 12 which web is of such dimensions as may be required to provide the metal to transmit to the brace 11 the heat necessary to provide for its desired contraction and expansion to maintain a piston skirt in constant relations with the interior surface of the cylinder, the wider the web the greater heat transmission, as will be readily understood.

In Figure 3 the construction shown is identical with that of Figure 2 except that both sides of the piston skirt are formed with the slots 8 and in addition to the brace 11 a second brace 14 is provided connecting the other portion 9 with the other side of the piston head 5, a web 15 similar to the web 12 being interposed for the same purpose.

In Figure 4 I show a construction identical with Figure 3 except that the braces 16 are separate pieces and may be of different material from the piston itself, while in Figures 2 and 3 the braces are shown as cast integral with and consequently of the same metal as the piston. In Figure 4 the braces 16 are connected with the webs 18 at their ends joined to the piston head and to webs 17 at their ends joined to the parts 9 of the skirt. Said braces 16 are preferably formed with knurled ends and are cast in the lugs or webs 17 and 18.

In each form shown a transverse web 20 extending in line with the wrist-pin is formed on the under side of the head and extends downwardly along the sides of the skirt to join with the wrist-pin bearings, thus forming a brace or stiffening member for the upper end of the piston.

It will be understood, of course, that by varying the size of the brace rods 11 and 14 and also the size of the webs 12 and 15, variation in the degree of expansion and contraction is provided for and that in the construction shown in Figure 4 variation may be provided for in a similar manner and likewise by providing the braces 16 of different materials. In all cases the parts are so proportioned in relation to each other that the desired results are obtained and the contraction and expansion of the piston skirt will substantially equal the contraction and expansion of the cylinder in which it is to be used, thereby enabling the piston to be made of a very close fit and such fit maintained in operation and the disadvantages of a loose piston as well as a too tight piston are avoided.

Having thus fully described my said invention, what I claim as new and desire to secure by Letters Patent is:

1. A piston comprising a head and a skirt, the skirt being provided with slits extending from a point near the head circumferentially and then longitudinally alongside of the wrist-pin bearings, and means for bracing each of the separated portions of the skirt independently of the other, substantially as set forth.

2. A piston comprising a head and a skirt, said skirt being formed with slots or openings separating portions of said skirt from the body thereof and a brace connecting the upper end of the separated portion with the opposite side of the piston head, substantially as set forth.

3. A piston comprising a head and a skirt, said skirt being formed with slots extending inwardly and then longitudinally to form portions of the skirt immediately beneath the head separated for a distance from the body thereof and braces connected to the upper end of the separated portions at one end and extending diagonally across the piston and connected at their opposite ends to the opposite sides of the piston head, substantially as set forth.

4. A piston comprising a head and a skirt, said skirt being formed with slots in its sides opposed to the axial line of the wrist-pin and separating the upper ends of these bearing faces of the skirt from the head, and braces connecting the said separated portions to the under side of the piston head, webs being interposed at the point of connection of said braces and piston head whereby the expansion of said braces may be regulated, substantially as set forth.

5. A piston comprising a head and a skirt, said skirt being slotted to separate a portion of said skirt from the body thereof and a brace connecting the upper end of the separated portion of the skirt with the opposite side of the piston head and a web interposed at the point of connection, whereby the expansion of said brace may be regulated, substantially as set forth.

6. A piston comprising a head and a skirt, said skirt being formed with a slot or opening separating a portion of said skirt from the body thereof and a brace connecting the separated portion with the opposite side of the piston head, substantially as set forth.

In witness whereof, I have hereunto set my hand and seal at Indianapolis, Indiana, this 22nd day of February, A. D. nineteen hundred and twenty-one.

ADOLPH L. NELSON. [L. S.]

Witnesses:
E. W. BRADFORD,
M. L. SHULER.